US009554319B2

(12) United States Patent
Li et al.

(10) Patent No.: US 9,554,319 B2
(45) Date of Patent: Jan. 24, 2017

(54) CHANNEL HANDOFF METHODS IN WIRELESS BROADCAST SYSTEMS

(75) Inventors: Linbo Li, San Diego, CA (US); Ashok Mantravadi, San Diego, CA (US); Fuyun Ling, San Diego, CA (US); Raghuraman Krishnamoorthi, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 702 days.

(21) Appl. No.: 11/828,333

(22) Filed: Jul. 25, 2007

(65) Prior Publication Data

US 2008/0020768 A1 Jan. 24, 2008

Related U.S. Application Data

(63) Continuation-in-part of application No. 11/359,148, filed on Feb. 21, 2006, now Pat. No. 7,706,288.
(Continued)

(51) Int. Cl.
*H04Q 7/20* (2006.01)
*H04W 36/28* (2009.01)
(Continued)

(52) U.S. Cl.
CPC ............ *H04W 36/28* (2013.01); *H04W 36/30* (2013.01); *H04W 72/085* (2013.01)

(58) Field of Classification Search
CPC ...................... H04W 36/30; H04W 72/085
(Continued)

(56) References Cited

U.S. PATENT DOCUMENTS 6,119,005 A * 9/2000 Smolik .................. 455/436
6,564,062 B1   5/2003 Hunzinger
(Continued)

FOREIGN PATENT DOCUMENTS

CN    1816190 A    8/2006
EP    0497115      8/1992
(Continued)

OTHER PUBLICATIONS

European Search Report, EP08006321—Search Authority, The Hague—Nov. 4, 2008.
(Continued)

*Primary Examiner* — Andrew Chriss
*Assistant Examiner* — Romani Ohri
(74) *Attorney, Agent, or Firm* — Arent Fox LLP

(57) ABSTRACT

Systems and methodologies are described that facilitate monitoring RF channels in a wireless communication environment to determine whether one or more channels comprise a forward-link-only (FLO) signal. A receiver can receive a first RF channel with a FLO signal and can monitor other RF channels for FLO signals. Upon a determination that a monitored RF channel comprises a FLO signal, the receiver can switch between the first RF channel and the monitored RF channel, employing information on current MLC decoding status, to facilitate providing seamless reception of the FLO signal, which can be superframe synchronized between RF channels. FLO signal detection can be performed using one or more of a wide-area identification channel energy detection protocol and a wide-area overhead information symbol decoding error detection protocol.

56 Claims, 12 Drawing Sheets

Related U.S. Application Data

(60) Provisional application No. 60/721,504, filed on Sep. 27, 2005.

(51) Int. Cl.
*H04W 36/30* (2009.01)
*H04W 72/08* (2009.01)

(58) Field of Classification Search
USPC .................................. 370/338, 331–337, 350
See application file for complete search history.

(56) References Cited

U.S. PATENT DOCUMENTS

| | | | |
|---|---|---|---|
| 6,853,646 B2 | 2/2005 | Alapuranen et al. | |
| 6,975,608 B1* | 12/2005 | Park et al. | 370/332 |
| 6,993,334 B2 | 1/2006 | Andrus et al. | |
| 7,050,406 B2 | 5/2006 | Hsu et al. | |
| 7,050,803 B2 | 5/2006 | Celedon et al. | |
| 7,136,680 B2 | 11/2006 | Leizerovich et al. | |
| 7,280,164 B2 | 10/2007 | Yen | |
| 7,313,398 B1 | 12/2007 | Ramahi | |
| 7,447,487 B2 | 11/2008 | Moore | |
| 7,508,842 B2 | 3/2009 | Baum et al. | |
| 7,556,034 B2 | 7/2009 | De Miranda Grieco | |
| 7,606,204 B2 | 10/2009 | Sebastian et al. | |
| 7,623,582 B2* | 11/2009 | Kim et al. | 375/260 |
| 2001/0019541 A1 | 9/2001 | Jou et al. | |
| 2001/0030948 A1 | 10/2001 | Tiedemann, Jr. | |
| 2002/0004396 A1 | 1/2002 | Shibasaki | |
| 2002/0021662 A1 | 2/2002 | Heyningen et al. | |
| 2002/0080895 A1* | 6/2002 | Lindberg | 375/316 |
| 2003/0002525 A1* | 1/2003 | Grilli et al. | 370/465 |
| 2003/0053546 A1* | 3/2003 | Gandhi et al. | 375/240.27 |
| 2003/0128752 A1* | 7/2003 | Harikumar et al. | 375/232 |
| 2003/0142670 A1 | 7/2003 | Gould et al. | |
| 2003/0169720 A1* | 9/2003 | Sebastian et al. | 370/342 |
| 2003/0190916 A1* | 10/2003 | Celedon et al. | 455/437 |
| 2003/0203735 A1* | 10/2003 | Andrus et al. | 455/450 |
| 2003/0231607 A1 | 12/2003 | Scanlon et al. | |
| 2004/0043769 A1 | 3/2004 | Amerga et al. | |
| 2004/0081117 A1* | 4/2004 | Malek et al. | 370/324 |
| 2004/0081125 A1* | 4/2004 | Ranta-Aho et al. | 370/335 |
| 2004/0174845 A1 | 9/2004 | Koo et al. | |
| 2004/0176090 A1 | 9/2004 | Mudigonda et al. | |
| 2004/0192222 A1* | 9/2004 | Vaisanen et al. | 455/78 |
| 2004/0192347 A1* | 9/2004 | Leizerovich et al. | 455/456.1 |
| 2005/0030931 A1* | 2/2005 | Sung et al. | 370/342 |
| 2005/0039103 A1* | 2/2005 | Azenko et al. | 714/776 |
| 2005/0043045 A1 | 2/2005 | Cheng et al. | |
| 2005/0043046 A1 | 2/2005 | Lee | |
| 2005/0044561 A1 | 2/2005 | McDonald | |
| 2005/0054315 A1 | 3/2005 | Bajgrowicz et al. | |
| 2005/0058076 A1 | 3/2005 | Richardson et al. | |
| 2005/0090257 A1* | 4/2005 | Kroner et al. | 455/436 |
| 2005/0107110 A1 | 5/2005 | Vasudevan et al. | |
| 2005/0111456 A1 | 5/2005 | Inazumi | |
| 2005/0147024 A1* | 7/2005 | Jung et al. | 370/203 |
| 2005/0163262 A1 | 7/2005 | Gupta | |
| 2005/0226353 A1 | 10/2005 | Gebara et al. | |
| 2005/0243831 A1* | 11/2005 | Zhang et al. | 370/394 |
| 2006/0025158 A1 | 2/2006 | Leblanc et al. | |
| 2006/0030322 A1 | 2/2006 | Kim et al. | |
| 2006/0063524 A1 | 3/2006 | Hwang | |
| 2006/0104228 A1* | 5/2006 | Zhou et al. | 370/328 |
| 2006/0120395 A1 | 6/2006 | Xing et al. | |
| 2006/0209837 A1 | 9/2006 | Lee et al. | |
| 2006/0250939 A1 | 11/2006 | Wang et al. | |
| 2006/0268756 A1* | 11/2006 | Wang et al. | 370/310 |
| 2007/0002742 A1 | 1/2007 | Krishnaswamy et al. | |
| 2007/0026810 A1 | 2/2007 | Love et al. | |
| 2007/0047489 A1* | 3/2007 | Bachl et al. | 370/331 |
| 2007/0057718 A1 | 3/2007 | Coulson | |
| 2007/0070936 A1 | 3/2007 | Stamoulis et al. | |
| 2007/0070963 A1 | 3/2007 | Li et al. | |
| 2007/0249353 A1 | 10/2007 | Kang et al. | |
| 2008/0020751 A1 | 1/2008 | Li et al. | |
| 2010/0165851 A1 | 7/2010 | Li et al. | |

FOREIGN PATENT DOCUMENTS

| | | |
|---|---|---|
| EP | 0503202 A2 | 9/1992 |
| EP | 1659819 | 5/2006 |
| EP | 1919246 | 5/2008 |
| GB | 2407003 | 4/2005 |
| JP | 04280510 | 10/1992 |
| JP | 2000138566 | 5/2000 |
| JP | 2001045393 A | 2/2001 |
| JP | 2004153618 A | 5/2004 |
| JP | 2004228724 | 8/2004 |
| JP | 2004320406 A | 11/2004 |
| JP | 2005535260 | 11/2005 |
| JP | 2006165667 A | 6/2006 |
| JP | 2006197492 A | 7/2006 |
| JP | 2008507232 A | 3/2008 |
| JP | 2008118404 A | 5/2008 |
| JP | 20090514269 | 4/2009 |
| JP | 2010534985 A | 11/2010 |
| WO | 9820635 | 5/1998 |
| WO | 0117125 | 3/2001 |
| WO | 0167626 | 9/2001 |
| WO | WO2004016016 | 2/2004 |
| WO | 2007014361 A2 | 2/2007 |

OTHER PUBLICATIONS

European Written Opinion, EP08006321—Search Authority, The Hague—Nov. 4, 2008.

Tia: "Forward Link Only Air Interface Specification Rev. 1.1," Dec. 22, 2005.

International Search Report, PCT/US2008/071244—International Search Authority—European Patent Office—Nov. 4, 2008.

Written Opinion, PCT/US2008/071244—International Search Authority—European Patent Office—Nov. 4, 2008.

International Preliminary Report on Patentability, PCT/US2008/071244, International Bureau, The International Bureau of WIPO, Feb. 4, 2010.

Taiwan Search Report—TW095135860—Apr. 1, 2010.

Translation of Third Office Action Dated Aug. 30, 2013 from the China State Intellectual Property Office, Patent Application No. 200880100042.5.

\* cited by examiner

CHANNEL HANDOFF METHODS IN WIRELESS BROADCAST SYSTEMS

CLAIM OF PRIORITY UNDER 35 U.S.C. §119

The present Application for Patent claims priority to Provisional Application No. 60/721,504 entitled "RF CHANNEL SWITCHING IN BROADCAST OFDM SYSTEMS" filed Sep. 27, 2005, and assigned to the assignee hereof and hereby expressly incorporated by reference herein.

CLAIM OF PRIORITY UNDER 35 U.S.C. §120

The present Application for Patent is a continuation-in-part of patent application Ser. No. 11/359,148 entitled "RF CHANNEL SWITCHING IN BROADCAST OFDM SYSTEMS" filed Feb. 21, 2006 now U.S. Pat. No. 7,706,288, and assigned to the assignee hereof and hereby expressly incorporated by reference herein.

BACKGROUND

I. Field

The following description relates generally to wireless communications, and more particularly to monitoring and switching radio frequency channels in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Presently, a forward-link-only (FLO) signal can be transmitted to a user device over a radio frequency (RF) channel that occupies, for instance, a 6 MHz bandwidth portion in the lower 700 MHz frequency band. FLO signals can be present in more than one RF channel, for example, to accommodate multiple streams of contents. However, conventional wireless systems do not provide for monitoring and/or switching between a plurality of RF channels containing FLO signals, and the like. Thus, there exists a need in the art for a system and/or methodology of improving throughput in such wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with monitoring RF channels in a wireless communication environment to determine whether one or more channels comprise(s) a forward-link-only (FLO) signal. A receiver can receive a first RF channel with a FLO signal and can monitor one or more other RF channels for FLO signals. Upon a determination that a monitored RF channel comprises a FLO signal, the receiver can switch between the first RF channel and the monitored RF channel to facilitate providing seamless reception of the FLO signal, which may be superframe synchronized between RF channels. FLO signal detection can be performed using one or more of a wide-area identification channel energy detection protocol and a wide-area overhead information symbol decoding error detection protocol. FLO detection can also be based on a cyclic prefix (CP) correlation protocol or a time-division multiplexed pilot (TDM pilot) detection protocol.

According to related aspects, a method of monitoring and switching between radio frequencies at an access terminal in a wireless communication environment is described herein. The method can include measuring a signal quality for a current channel. Further, the method can include determining whether the measured signal quality is above a predetermined threshold value. Moreover, the method can include monitoring a signal quality of at least one neighbor channel. Additionally, the method can include generating a handoff flag based at least in part on the signal quality of the current channel and the at least one neighbor channel.

Another aspect relates to a wireless communications apparatus. The wireless communications apparatus can facilitate switching between radio frequencies (RFs) at an access terminal in a wireless communication environment. The wireless communications can include a receiver that monitors at least one neighboring RF and analyzes an RSSI there for. Moreover, the wireless communications apparatus can include a memory that stores information related to RSSI and identity information for a current RF and the at least one neighboring RF. Further, the wireless communications apparatus can include a processor, coupled to the memory, that switches between the current RF channel and the at least one neighboring RF channel.

Yet another aspect relates to a wireless communications apparatus. The wireless communications apparatus can include means for measuring a signal quality for a current channel; means for determining whether the measured signal quality is above a predetermined threshold value; means for monitoring a signal quality of at least one neighbor channel; and means for generating a handoff flag based at least in part on the signal quality of the current channel and the at least one neighbor channel.

Still another aspect relates to a computer-readable medium having a computer program comprising computer-executable instructions for measuring a signal quality for a current channel, determining whether the measured signal quality is above a predetermined threshold value, monitoring a signal quality of at least one neighbor channel, and generating a handoff flag based at least in part on the signal quality of the current channel and the at least one neighbor channel.

In accordance with another aspect, a processor can execute instructions for increasing throughput in a wireless communication environment. The instructions can include measuring a signal quality for a current channel; determining whether the measured signal quality is above a predetermined threshold value; monitoring a signal quality of at least one neighbor channel; and generating a handoff flag based at least in part on a decoder error rate or the signal quality of the current channel and the at least one neighbor channel.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
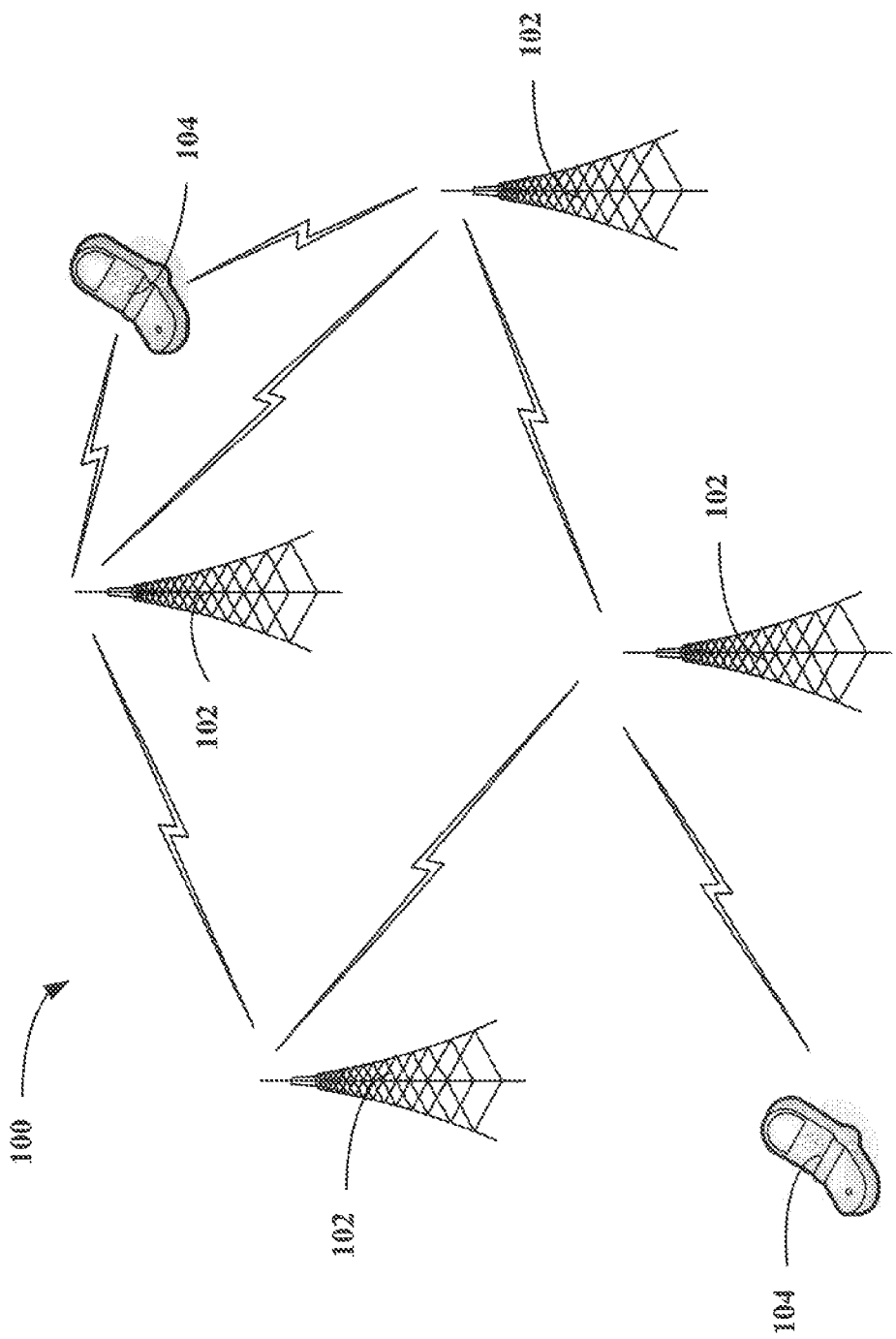
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem. Additionally, the term "channel" as used herein can be a combination of an RF channel, wide-area identity (WID) channel and local-area identification (LID) channel, namely (RF, WID,LID).

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

Referring now to FIG. 1, a wireless network communication system 100 is illustrated in accordance with various embodiments presented herein. System 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100. System 100 can be employed in conjunction with various aspects described herein in order to facilitate monitoring and/or switching between forward-link-only (FLO) channels in a wireless communication environment, as set forth with regard to subsequent figures.

For example, base stations 102 can transmit FLO signals over a plurality of different RF channels, where each base station 102 can employ one or more RF channels. Additionally and/or alternatively, a same RF channel may be utilized by more than one base station 102. User device(s) 104 can then employ one or more algorithms and/or methods (e.g., by way of a processor, computer-executable instructions, a computer-readable memory, . . . ) to monitor a plurality of the RF channels being utilized to broadcast FLO signals, and can switch between RF channels in order to improve communication throughput between one or more base stations 102 and the user device 104.

Figure 2:
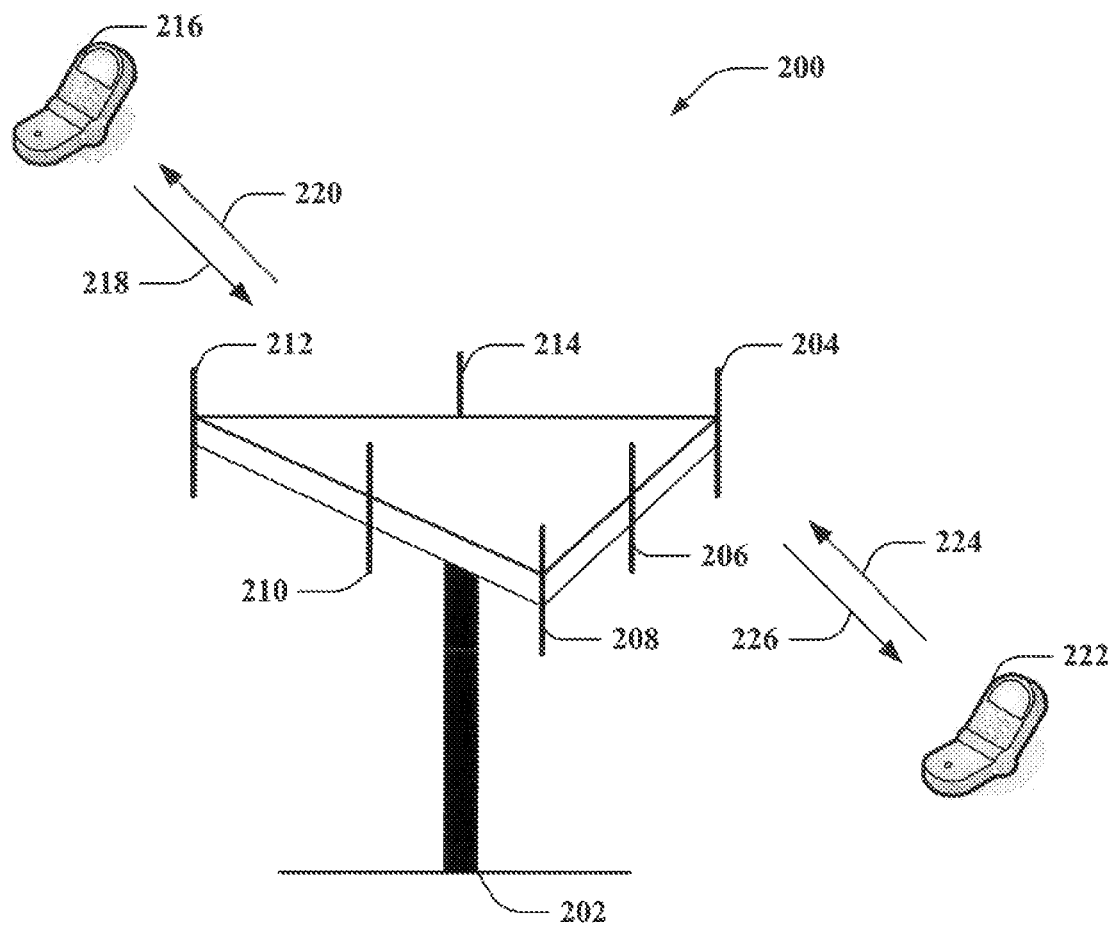
FIG. 2 is an illustration of a multiple access wireless communication system according to one or more embodiments.

Referring now to FIG. 2, a multiple access wireless communication system 200 according to one or more embodiments is illustrated. System 200 is presented for illustrative purposes and can be utilized in conjunction with various aspects set forth below. A 3-sector base station 202 includes multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In one embodiment, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

In accordance with one or more aspects, a user device, such as user device 216, can monitor multiple RF channels comprising FLO signals (e.g., transmitted over forward link 220 . . . ) and can switch between such channels to optimize reception at user device 216. A FLO signal can be targeted to occupy a channel of approximately 6 MHz of bandwidth in the lower 700 MHz frequency band of a communication system; however, it is contemplated that a FLO signal can leverage other bandwidths such as 5, 7, 8, etc. MHz and/or can reside in other RF frequencies in addition to or instead of the lower 700 MHz band. When FLO signals are present in more than one radio frequency (RF) channel to accommodate more streams of contents, it can be desirable to investigate the issues of monitoring, acquiring, and handoff to different RF channels. The scenarios in which a receiver (e.g., in a user device) may initiate monitoring and switching to new FLO RF channels are several. For example, the receiver can initiate monitoring and/or switching of channels upon a serious failure, such as loss of lock in the context of re-acquisition, which may occur on a current FLO RF channel. According to another example, it may be desirable to initiate and/or monitor a FLO RF channel upon initiation of an application layer. Another example relates to monitoring and/or switching new RF channels during an idle mode of a receiver. Yet another example relates to background monitoring of new RF channels (e.g., periodic, reception quality dependent, . . . ). According to another example, during power-up of a device, the device can monitor all RFs and select the best RF for operations.

Before initiating monitoring new channels, the receiver can be provided with a list of RF channels among which it can search for a FLO signal. This initial list can be obtained from a FLO network by decoding control channel messages. The network can broadcast RF description messages to FLO receivers through the control channel according to a predetermined schedule (e.g., once every superframe, . . . ). A plurality of information fields can be defined and/or populated to facilitate providing such information to the FLO receiver. For instance, an "RFChannelCount" field can contain a number of RF channels that have FLO broadcast. Fields related to RFChannelID, Frequency, and ChannelPlan can contain information related to the channel identifier, the center frequency, and the channel bandwidth of the RF channels indicated in RFChannelCount, respectively. The receiver can search for FLO signal on these RF channel candidates and can determine if FLO broadcast is indeed available or decodable on such channels.

Figure 3:
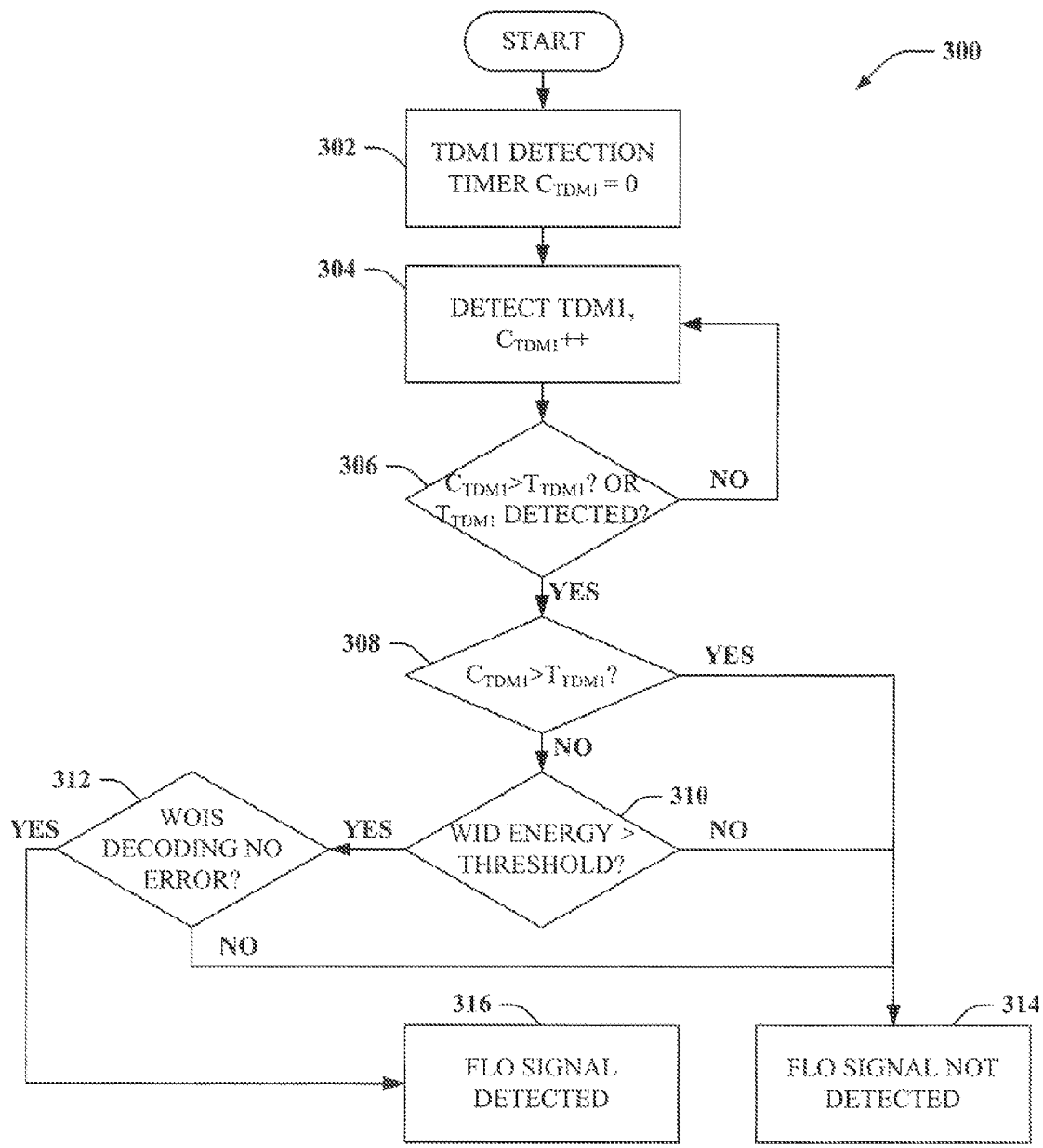
FIG. 3 is an illustration of a methodology for detecting a FLO signal, in accordance with various aspects.

Referring to FIG. 3, a methodology relating to FLO signal detection is illustrated. For example, a methodology can relate to monitoring, detecting, and/or switching between FLO RF channels in an FDMA environment, an OFDMA environment, a CDMA environment, a WCDMA environment, a TDMA environment, an SDMA environment, or any other suitable wireless environment. While, for purposes of simplicity of explanation, the methodology is shown and described as a series of acts (as well as other methodologies illustrated herein), it is to be understood and appreciated that the methodology are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

In accordance with such method, monitoring of new RF channels can be initiated, for instance, after a serious failure of FLO operation on a current RF channel, such as a loss of lock in the context of re-acquisition. For example, a receiver can attempt to re-acquire reception on an original RF channel (e.g., the lost channel). If signal lock is not obtained within a re-acquisition timeout for the original channel, the receiver can begin monitoring new RF channels on a candidate list obtained from control channel messages. Since lock of the original channel is already lost, it is not necessary to store and recover the key parameters of blocks such as direct current (DC), automatic gain control (AGC), automatic frequency control (AFC), and timing of the original FLO channel. The receiver can switch to a new RF channel and restart detection of a FLO signal.

FIG. 3 is an illustration of a methodology 300 for detecting a FLO signal, in accordance with various aspects. Upon initiation of FLO signal detection, a TDM1 (Time-Division Multiplexed Pilot 1) detection timer $C_{TDM1}$ can be initiated to 0 at 302. Then FLO device attempts to detect TDM pilot 1 on the received signal at 304. Also at 304, the TDM1 detection timer $C_{TDM1}$ is incremented. At 306, a determination can be made regarding if FLO device has successfully detected TDM1 and if the TDM1 detection timer $C_{TDM1}$ has exceeded the TDM1 detection timeout $T_{TDM1}$. If neither event occurs, the method goes back to 304. At 304 the method reattempts to detect TDM1 and the TDM1 detection counter $C_{TDM1}$ is incremented. If it is determined in 306 that $C_{TDM1}$ has exceeded the timeout value $T_{TDM1}$, TDM1 detection has failed and FLO signal is not detected. In this case, the method proceeds to 314, where an indication that a FLO signal is not detected can be generated. If it is determined in 306 that TDM1 has been successfully detected, then at 310, an energy level for a wide-area identity (WID) channel associated with the transmission being analyzed can be ascertained and compared to a predetermined threshold energy level. If the detected WID energy is not greater than the predetermined threshold level, then a conclusion may be drawn that the FLO signal is not detected, at 314. If the detected WID energy is greater than the threshold value, then at 312, a determination can be made regarding whether an error has occurred during decoding of a WOIS (wide-area overhead information symbol) in the transmission being analyzed (e.g., upon detection of a WID associated with the transmission). If an error has occurred, then it may be concluded that the FLO signal is not detected, at 314. If no error has occurred during decoding of the WOIS, then at 316, a conclusion may be drawn that the FLO signal is detected. Each of the three criteria, namely TDM1 detection (blocks 302 to 308), WID energy (block 310), WOIS packet error rate (block 312), may or may not be used in the method 300. As seen from method 300, FLO signal can be detected employing one or more of the above criteria. It will be understood that method 300 is iterative and can be repeatedly and/or continuously performed by, for example, a user device communicating in a wireless communication environment to facilitate FLO signal detection.

Thus, according to the methodology 300, determining whether FLO service is available on another RF channel can be performed. The approach first attempts to detect TDM Pilot 1 (TDM1). After TDM Pilot 1 detection, if the WID detection returns energy weaker than the threshold, FLO signal can be declared unavailable on the new channel. If instead the detected WID energy is higher than the threshold, the receiver continues to decode WOIS and uses the Turbo decoding PER as the detection criterion.

To save receiver power consumption, a received signal strength indicator (RSSI) on the new channel can be used as an early-exit condition. For example, after switching to the new channel and the acquisition of direct current (DC) and automatic gain control (AGC), the receiver first calculates the RSSI of the new channel based on a digital variable gain amplifier (DVGA) loop accumulator and AGC gain state information. If the RSSI is higher than a predefined threshold, the receiver may proceed to execute a searching procedure employing one or more criteria as shown in method 300. If not, FLO may be declared unavailable on the new channel.

It will be appreciated that, in accordance with one or more aspects described herein, inferences can be made regarding channel monitoring, FLO signal detection, RF channel switching, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding whether to switch between RF channel frequencies based on extrinsic information, such as signal strength or the like. For instance, a power level associated with a current RF channel can be continuously and/or periodically monitored. A determination can be made (e.g., by a receiver, a processor, . . . ) that the power level is increasing as a user device moves through a sector or region of a wireless communication system (e.g., the user device is moving toward the source of the RF transmission), in which case an inference may be made that no channel switch is presently necessary. According to a related example, evaluation of the RF channel power level may indicate that channel power is decreasing as the user device moves through the coverage area (e.g., the user device is moving away from the source of the RF transmission), in which case an inference may be made that switching to a new RF channel will be imminently desirable, and actions related thereto may be initiated. Such inferences can be based on, for instance, a comparison of a detected power level to a predetermined threshold power level to assess whether channel switching is desirable. Additionally and/or alternatively, each successive power level evaluation can be compared to one or more preceding power level readings to provide power level trend information as the user device moves throughout one or more coverage areas. It will be appreciated that the foregoing example is illustrative in nature and is not intended to limit the number of inferences that can be made or the manner in which such inferences are made in conjunction with the various embodiments and/or methods described herein.

Figure 4:
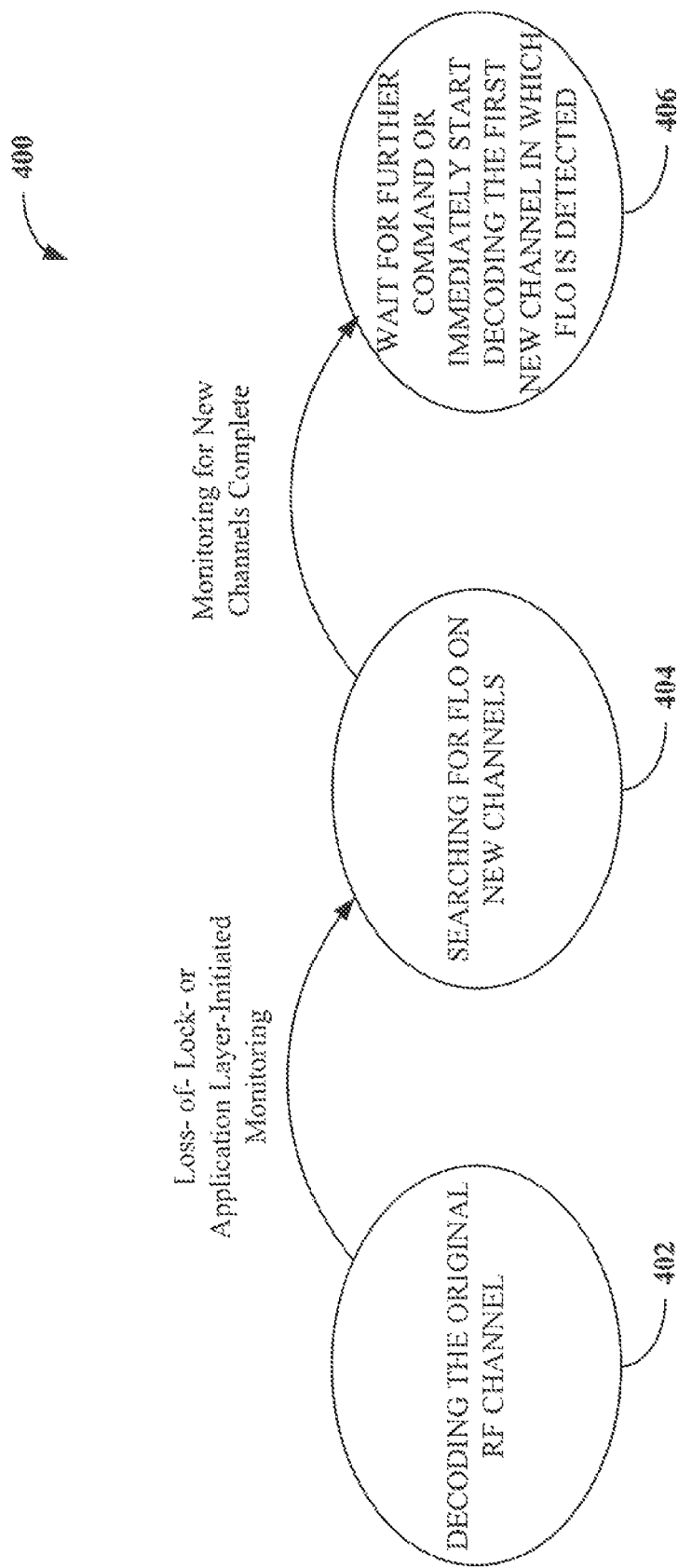
FIG. 4 illustrates a high-level state transition diagram for FLO cannel monitoring, in accordance with one or more aspects.

FIG. 4 illustrates a high-level state transition diagram 400 for FLO channel monitoring, in accordance with one or more aspects. At 402, an original RF channel may be decoded. Upon an occurrence of a loss of lock, or upon application layer-initiated monitoring, FLO signal searching can be initiated on new RF channels, at 404. Upon completion of new channel monitoring, at 406, further instruction can be awaited. According to another aspect, at 406, decoding of a first channel over which a FLO signal is detected can begin.

In conjunction with the preceding figures, for the loss of lock based monitoring, all approaches of FLO signal searching can be applied. Following a period during which the RF circuit switches to the new channel, two OFDM symbols may be used for the acquisition of the DC and AGC blocks for the new channel. If it is determined by the searching scheme that FLO service is available, demodulation of the new FLO signal may be initiated. The RF switching and settling time may be, for example, approximately 5 ms, which is insignificant compared to the superframe duration of 1 second. If a FLO signal is available on the new channel, the wait time until a next occurrence of a TDM Pilot 1 can be up to 1 second, and therefore the TDM Pilot 1 detection timeout $T_{TDM1}$ can be predefined to be approximately 1 second.

The monitoring of new channels can also be initiated by the application layer. For instance, software can issue a command to monitor new RF channels, and decoding and/or video playing of the original channel may be terminated as a result. As in loss of lock-based monitoring, the key parameters for the original FLO channel need not be restored, and any of the FLO signal searching methods illustrated in method 300 may be employed. Considerations made for the loss of lock based monitoring are also applicable in this scenario.

Figure 5:
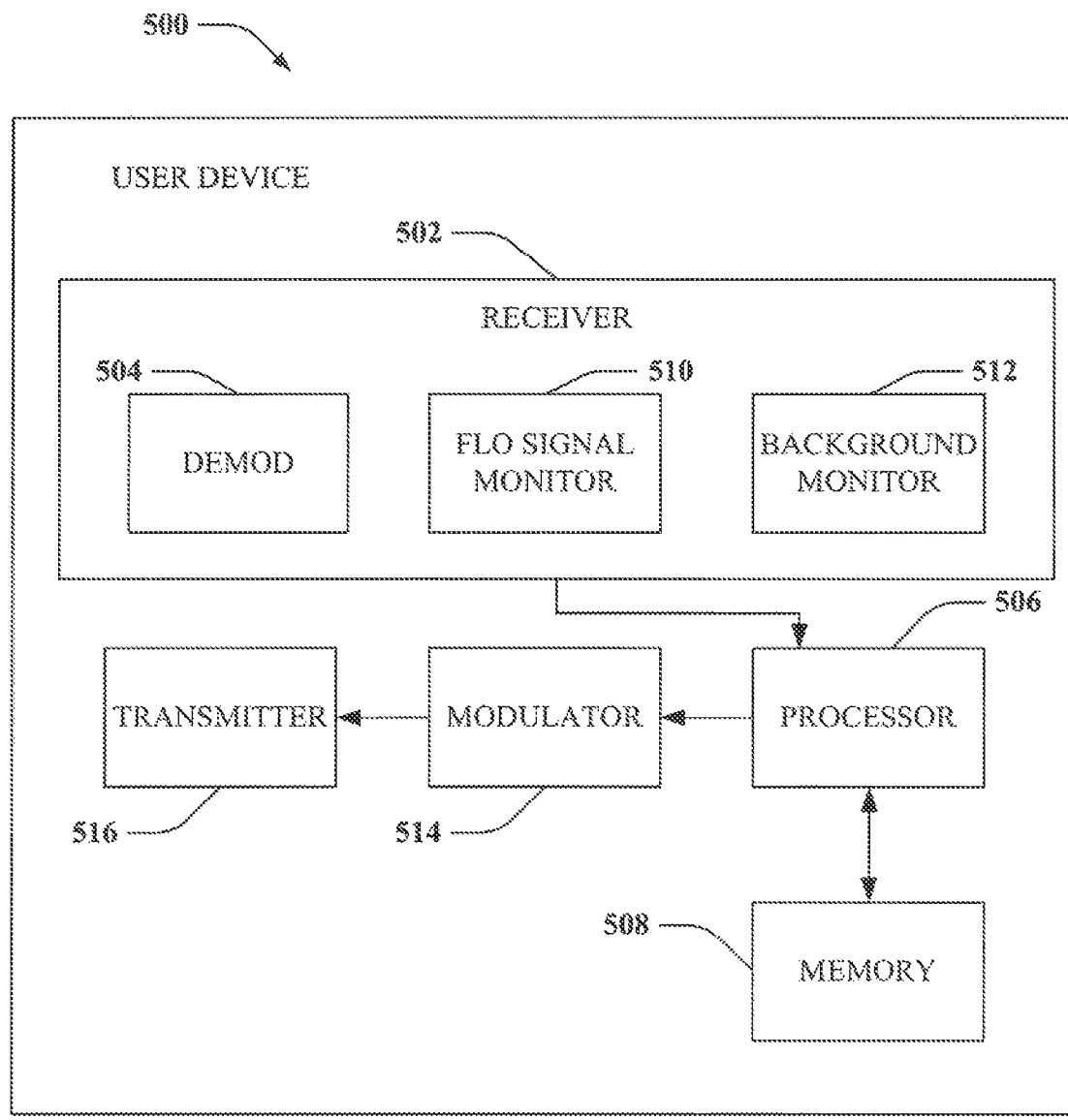
FIG. 5 is an illustration of a user device that facilitates FLO channel monitoring and/or switching over a FLO channel in a wireless communication environment, in accordance with one or more aspects set forth herein.

FIG. 5 is an illustration of a user device 500 that facilitates FLO channel monitoring and/or switching over a FLO channel in a wireless communication environment, in accordance with one or more aspects set forth herein. User device 500 comprises a receiver 502 that receives a signal from, for instance, a receive antenna (not shown), and performs typical actions thereon (e.g., filters, amplifies, downconverts, etc.) the received signal and digitizes the conditioned signal to obtain samples. A demodulator 504 can demodulate and provide received pilot symbols to a processor 506 for channel estimation. Processor 506 can be a processor dedicated to analyzing information received by receiver 502 and/or generating information for transmission by a transmitter 516, a processor that controls one or more components of user device 500, and/or a processor that both analyzes information received by receiver 502, generates information for transmission by transmitter 516, and controls one or more components of user device 500.

User device 500 can additionally comprise memory 508 that is operatively coupled to processor 506 and that stores information related to RF channel identity, TDM pilot information associated therewith, TDM pilot counter adjustments, lookup table(s) comprising information related thereto, and any other suitable information for supporting monitoring and/or switching RF channels to provide seamless information display to a user in a wireless communication system as described herein. Memory 508 can additionally store protocols RF channel monitoring, RF channel switching, etc., such that user device 500 can employ stored protocols and/or algorithms to perform the various methods described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 508 of the subject systems and methods is intended to comprise, without being limited to, these and any other suitable types of memory.

Receiver 502 can further comprise a FLO channel monitor 510 that facilitates initiating monitoring of new FLO RF channels upon, for instance, a loss-of-lock occurrence, as described above. Additionally and/or alternatively, FLO channel monitor 510 can perform application-initiated FLO channel monitoring. Receiver 502 can still further comprise a background monitor 512 that performs various actions related to background monitoring of one or more RF channels. For example, background monitor 512 can enforce several constraints related to the DC, AGC, AFC, and timing blocks, in order to restore the receiver operation on the original channel when an RF frequency is switched back.

For example, with regard to a DC block, before switching to a new RF channel, coarse and fine loop accumulators (and/or other registers) associated with a current RF channel may be stored in memory 508. Such loop accumulators may be recovered after switching back to the original channel. Regarding an AGC block, AGC gain state and DVGA loop accumulator value for a current channel may be stored before switching and recovered upon switching back. For an AFC block, an outer loop frequency accumulator may be frozen (e.g., stored) after switching to a new channel and before switching back to an original channel. Because the RF is switched only temporarily to search for FLO signal, the outer loop update may be associated with a temperature-compensated voltage control crystal oscillator (TCVCXO) when operating on the new channel and the inner loop may be employed to track, for instance, residual frequency error and Doppler for the new channel. The frequency accumulator of the inner loop may be stored to memory 508 before switching to the new channel and may be recovered after switching back to the original channel, upon which the outer loop may be updated again to facilitate resuming operation on the original channel. For the timing block, and in view of the fact that the above-described FLO searching methods detect the TDM Pilot 1 on the new channel, the TDM Pilot 1 counter adjustment may be stored to memory 508 after TDM Pilot 1 is detected on the new channel, and may be undone before the channel is switched back to the original frequency. Whether using the WOIS PER method or the combined WID/WOIS method for FLO signal searching, the TDM Pilot 2 for new channel is always processed so that a TDM Pilot 2 counter adjustment for the new channel may also be stored and undone before switching back to an original channel. In this manner, receiver 502 can perform a plurality of RF channel monitoring functions in conjunction with FLO signal searching and/or switching to facilitate improved user experience and seamless reception of streaming data or the like.

Figure 6:
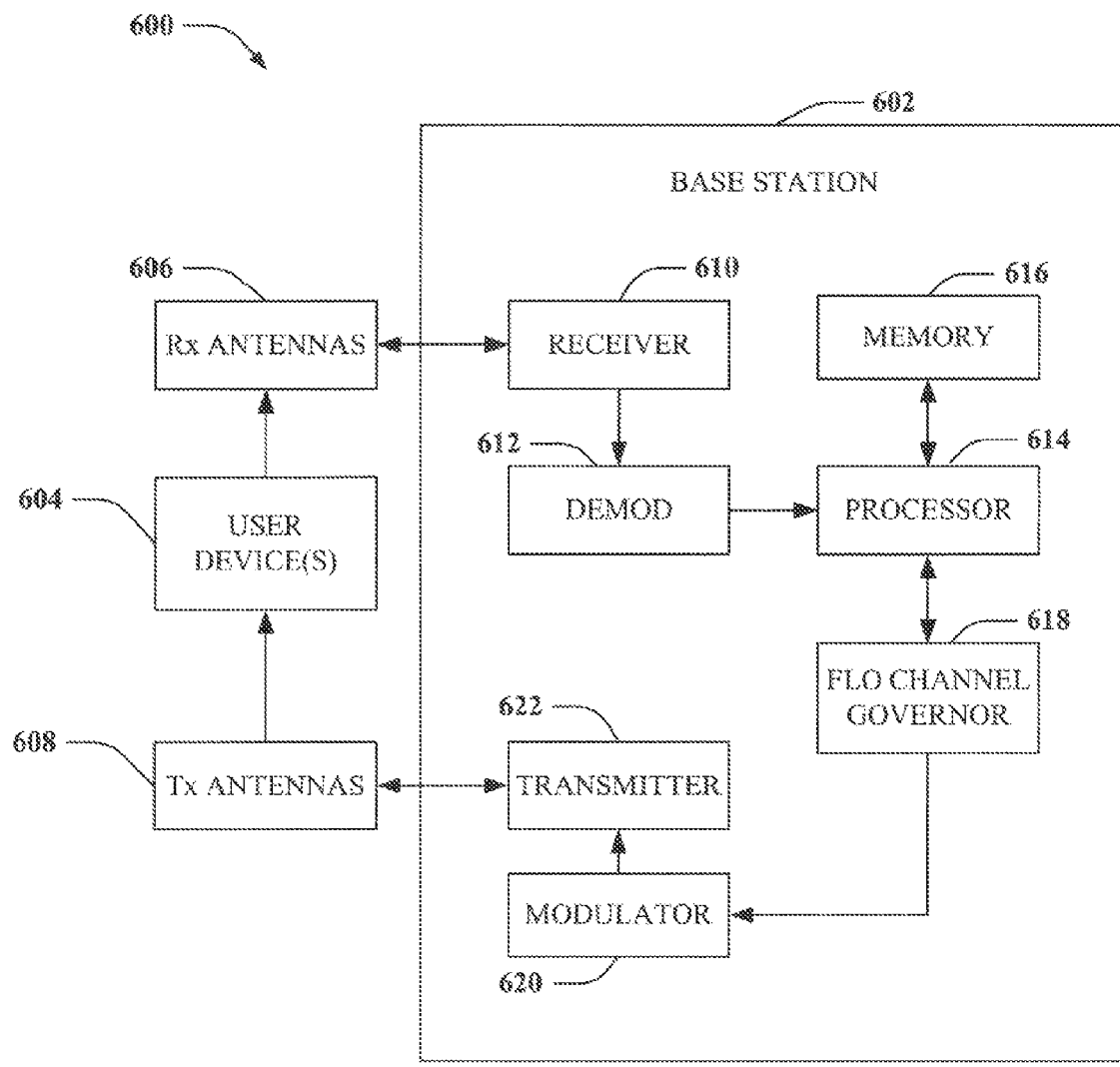
FIG. 6 is an illustration of a system that facilitates providing multiple RF channels in a wireless communication environment in accordance with various aspects.

FIG. 6 is an illustration of a system 600 that facilitates providing multiple RF channels in a wireless communication environment in accordance with various aspects. System 600 comprises a base station 602 with a receiver 610 that receives signal(s) from one or more user devices 604 through a plurality of receive antennas 606, and a transmitter 622 that transmits to the one or more user devices 604 through a transmit antenna 608. Receiver 610 can receive information from receive antennas 606 and is operatively associated with a demodulator 612 that demodulates received information. Demodulated symbols are analyzed by a processor 614 that is similar to the processor described above with regard to FIG. 5, and which is coupled to a memory 616 that stores information related to RF channel frequencies, data transmitted over RF channels, lookup tables related thereto, and/or any other suitable information related to performing the various actions and functions set forth herein. Processor 614 is further coupled to a FLO channel governor 618 that synchronizes superframe transmissions on multiple RF channels, which can facilitate RF channel switching by user device(s) 604 as described with regard to preceding figures. A modulator 620 can multiplex a signal for transmission by transmitter 622 through transmit antenna 608 to user device(s) 604. In this manner, base station 602 can interact with user device(s) 604 to permit RF channel switching, FLO signal detection, channel monitoring, etc.

According to various other aspects described herein, FLO signals on different RF channels may be superframe-synchronized to facilitate switching between and/or monitoring of RF channels. FLO signals on different RF channels may also be designed to have the same or similar bandwidths to mitigate complication associated with switching between different clock rates. Additionally, a "wide area" may be generalized to the union of coverage areas broadcasting the same wide multiplexes, which may occur on the same or different RF channels. Moreover, the various methods and systems described herein can provide air interface support by, for instance, maintaining a list of RF channels utilized in a neighboring region or area, such as neighboring RF channels within a same wide-area as well as RF channels in adjacent WOI areas. Within a wide area, control channel information may be similar or identical for different nodes to facilitate seamless handoff of a user device. In this manner, the systems and methods described herein can facilitate specifying timelines for RF channel switching, software and/or hardware monitoring operations, operating conditions under which different methods/routines/subroutines are called, etc.

Figure 7:
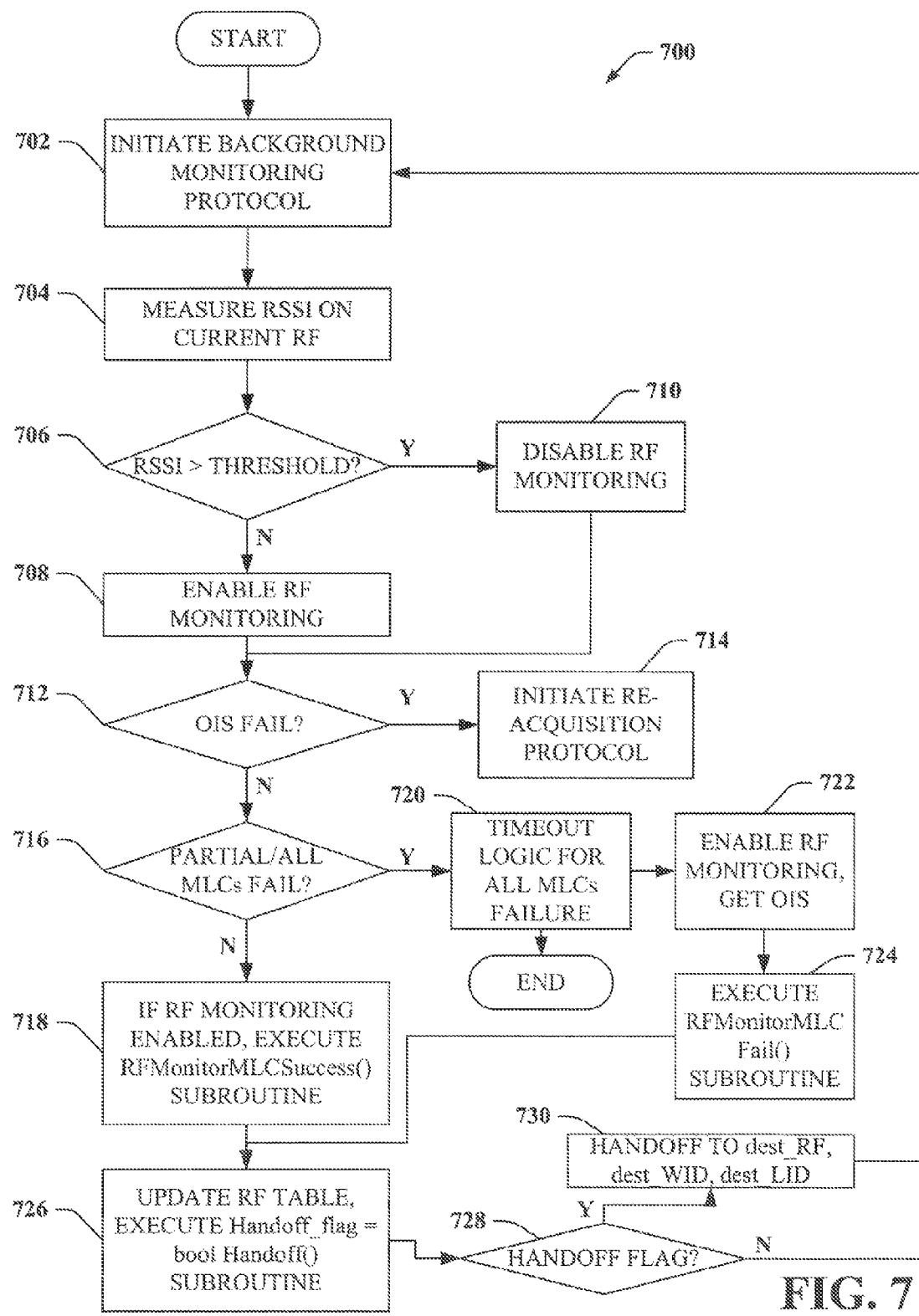
FIG. 7 is an illustration of a method for performing background monitoring of neighboring radio frequencies, in accordance with various aspects described herein.

FIG. 7 is an illustration of a method 700 for performing background monitoring of neighboring radio frequencies, in accordance with various aspects described herein. At 702, background monitoring may be initiated. RSSI on a current RF may be measured to determine the received signal strength, at 704. A determination may be made, at 706, regarding whether the measured RSSI is greater than or equal to a predetermined threshold level. If the measured RSSI is below the threshold level, then at 708 RF monitoring may be enabled before proceeding to 712. If the measured RSSI is equal to or greater than the threshold level, then at 710, RF monitoring may be disabled before proceeding to 712.

At 712, a determination may be made regarding whether an overhead information symbol failure has occurred. If so, then the method may proceed to 714, where a re-acquisition protocol may be initiated and performed. If the determination at 712 is negative, then at 716, a determination may be made regarding whether one or more MLC failures have occurred. If the determination is negative, then at 718 an RF monitoring subroutine (e.g., RFMonitorMLCSuccess( ) subroutine) may be initiated if RF monitoring was enabled at 708, before proceeding to 726. The RF monitoring subroutine may monitor RFs on neighboring RF lists that have the same wide-area identification (WID) as a current RF using one of the monitoring methods (e.g., RSSI-only or RSSI+CP correlation), depending on the MLC gap. In a case where only local MLCs are decoded, no RF monitoring need be performed.

If the determination at 716 is positive, then at 720, timeout logic for a total MLC failure may be implemented. The method may then proceed to 722, where RF monitoring is enabled if it has not already been enabled, and where an overhead information symbol is obtained. At 724, a monitoring subroutine may be initiated (e.g., RFMoonitorMLCFail( ) subroutine), whereby RFs on a neighboring RF list may be monitored using the RSSI-only monitoring protocol or the RSSI+CP correlation monitoring protocol, depending on the MLC gap. Typically, during RSSI-only monitoring, the device switches to the neighbor channel for monitoring and it only monitors the RSSI of the neighbor channel, whereas, during RSSI+CP correlation monitoring, the device monitors both RSSI and CP correlation on the neighbor channel. WID and/or local-area identification (LID) symbols may be processed for the current RF, and hardware can return a number of most-relevant WID/LID energies to a software application. RSSI on other RFs and WID/LID energies on the current RF may be utilized by a handoff subroutine to make a handoff decision.

At 726, an RF table that contains information related to RFs in a current and/or neighboring lists may be updated, and a handoff subroutine may be performed. At 728, a determination may be made regarding whether a handoff flag is present. If the determination is negative, then no handoff need be performed and the method may revert to 702 for further iteration. If the determination is positive, then at 730, a handoff may be performed (e.g., to a destination RF, a destination WID, a destination LID, etc.), and the method may then proceed to 702 for further iteration of background monitoring. It will be understood that various RFs, WIDs, LIDs, hystereses, etc., are numbered herein to distinguish them from each other (e.g., RF1, RF2, RF3, etc.; WID1, WID2, etc.; LID1, LID2, etc.; Hys1, Hys2, etc). The handoff subroutine performed at 726 may assume that a current RF may be labeled RF1, WID1, LID1, etc. The handoff subroutine may operate in a wide-area-only mode, a local-only mode, or a combination thereof. Additionally, the table comprising information related to RF identities, WIDs and/or LIDs associated therewith, as well as any other suitable information, may be updated. The RF table may be formatted such that each neighboring RF has an RSSI value stored in the table. The current RF may be stored in the table along with an associated RSSI value and a number (e.g., 3, 4, 6, etc) of the highest WID energies, as well as the highest LID energies associated therewith. If the RSSI+CP correlation protocol is employed, an entry in the RF table is updated when a CP correlation value for the entry is greater than a CP correlation threshold value. A time stamp may also be stored to indicate a most recent monitoring of the entry. If a CP correlation value for the entry is less than the CP correlation threshold value, then the entry may be cleared. The RSSI value for a given entry may be averaged across multiple monitoring sessions, such that $$RSSI(n+1) = (1-\alpha^{T(n+1)-T(n)}) \cdot r(n+1) + \alpha^{T(n+1)-T(n)} \cdot RSSI(n)$$

In the case of the RSSI-only protocol, RSSI may be recorded for each RF and averaged according to the above equation.

With regard to handoff, seamless handoff may be given higher priority than non-seamless handoff. Typically, if a neighbor channel carries the same WID/LID as the current RF, the contents being broadcast on both channels are the same. As a result, during handoff, there is no superframe loss and the handoff is seamless. Otherwise, if the WID/LID of the neighbor RF is different than the current, the handoff is non-seamless. Additionally, handoff to a different WID or LID (e.g., non-seamless handoff) may be permitted when all wide or local MLCs fail. An MLC can fail when the number of errors in it is above a threshold. In the event that a neighboring RF has multiples WIDs with one of the WIDs the same as the WID on the current RF, a handoff thereof may be treated as a seamless handoff. For wide-only handoff, only the wide-area MLC need be decoded. According to an example that relates to neighboring RFs with different WIDs (e.g., RF1/WID2 and RF2/WID1), if RSSI_RF2 is greater than RSSI_RF1 (e.g., or WID1 energy) combined with a first hysteresis (e.g., Hys1), then the handoff_flag is true, and dest_RF is RF2 and dest_WID is WID1, which provides a seamless handoff. If all MLCs fail and the difference between WID2 energy and WID1 energy is greater than a second hysteresis, then a handoff_flag condition may be true and dest_RF is RF1 and dest_WID is WID2. In other cases, the handoff_flag condition may be false. Additionally, Hys1 may be sub-defined to have high and low values (e.g., Hys1_H and Hys1_L) that are used with MLC success and MLC failure, respectively.

According to another example, wherein two neighboring RFs have a common WID (e.g., RF1/WID2 and RF2/WID2), if a failure is detected for all associated MLCs and a maximum energy (e.g., RSSI_RF2, WID2_Energy) is greater than RSSI_RF1 (or WID1_Energy) combined with a second hysteresis (e.g., Hys2), then a handoff_flag condition is present and dest_RF is RF1 or RF2 and dest_WID is WID 2. If the foregoing conditions are not satisfied, then the handoff_flag condition is false (e.g., no handoff is necessary). It will be appreciated that Hys1 may be less than Hys2 to facilitate giving seamless handoff priority over non-seamless handoff.

For local-only handoff, a subroutine can decode local MLC(s). For example, in a case where three RFs with various WIDs and LIDs are neighboring (e.g., RF2/WID1/LID-any, RF1/WID2/LID-any, and RF1/WID1/LID2; RF2/WID2/LID-any, RF1/WID2/LID-any, and RF1/WID1/LID2; etc.), if MLC failure is detected and the argument max{$RSSI\_RF2, WID2\_Energy, WID1\_LID2\_Energy$}>$RSSI\_RF1$ (or $WID1\_Energy$)+$Hys3$ is true, then a handoff condition exists and destinations for the handoff may be set (e.g., dest_RF, dest_WID, dest_LID, etc. If the argument is not true, then a handoff condition is not present. It will be noted that Hys3 may be set equal to Hys2 if desired.

According to yet another aspect, when handing off in both wide and local modes, various criteria may apply to determine whether a handoff condition exists. For example, in the case of three neighboring RFs, such as RF1/WID1/LID2, RF1/WID2/LID-any, and RF2/WID1/LID-any, if all wide-area MLCs succeed and at lease one local MLC succeeds, then a handoff condition does not exist. If all wide-area MLCs succeed and all local MLCs fail, and if the argument max{($WID1\_LID2\_Energy-WID1\_LID1\_Energy$),
($RSSI\_RF2-RSSI\_RF1$ (or $WID1\_Energy$))}>$Hys4$ is true, then a handoff condition exists and a handoff flag may be generated to indicate the condition. A user device may then be assigned a handoff destination (e.g., dest_RF, dest_WID, and dest_LID may be set for the user device). The handoff may additionally be seamless from a wide-area standpoint. If the above argument is not true, then a handoff condition may be deemed not to be present. Additionally, Hys4 may be set equal to Hys1_H by default.

According to another example, where at least one wide-area MLC fails, if the argument max{($WID1\_LID2\_Energy-WID1\_LID1\_Energy$),
($RSSI\_RF2-RSSI\_RF1$ (or $WID1\_Energy$))}>$Hys5$ is true, then a handoff condition can be deemed to be present and destination RF, WID, and LID may be set. In the event that all wide-area MLCs fail, the above argument is false, and the argument $WID2\_Energy-WID1\_Energy$>$Hys6$ is true, then a handoff condition is present and handoff destinations may be set (e.g., dest_RF=RF1, dest_WID=WID2, dest_LID=LID-any, etc.). If such arguments are not true, then a handoff condition may be deemed not to be present. It will be appreciated that Hys5 may be set equal to Hys1_L, and Hys6 may be set equal to Hys2.

According to yet another example, in the case of three neighboring RFs, such as RF1/WID1/LID2, RF1/WID2/LID-any, and RF2/WID2/LID-any, if all wide-area MLCs succeed and fewer than all local MLCs fail, then a handoff condition does not exist. If all wide-area MLCs succeed and all local MLCs fail, and if the argument $WID1\_LID2\_Energy-WID1\_LID1\_Energy$>$Hys4$ is true, then a handoff condition is present and handoff destinations may be set (e.g., dest_RF=RF1, dest_WID=WID1, dest_LID=LID2, etc.). If such arguments are not true, then a handoff condition may be deemed not to be present and a handoff flag may be indicated as false (e.g., assigned a bit value of 0, or a bit value of 1 if a false high bit value system is employed, etc.).

In other cases where at least one wide-area MLC failure is detected, if the argument $WID1\_LID2\_Energy-WID1\_LID1\_Energy$>$Hys5$ is true, then a handoff condition can be deemed to be present and destination RF, WID, and LID may be set (e.g., dest_RF=RF1, dest_WID=WID1, and dest_LID=LID2). In the event that all wide-area MLCs fail, and the argument max{($RSSI\_RF2-RSSI\_RF1$ (or $WID1\_Energy$)),
($WID2\_Energy-WID1\_Energy$)}>$Hys6$ is true, then a handoff condition is present and handoff destinations may be set (e.g., dest_RF=RF1 or RF2, dest_WID=WID2, dest_LID=LID-any, etc.). If such arguments are not true, then a handoff condition may be deemed not to be present.

Figure 8:
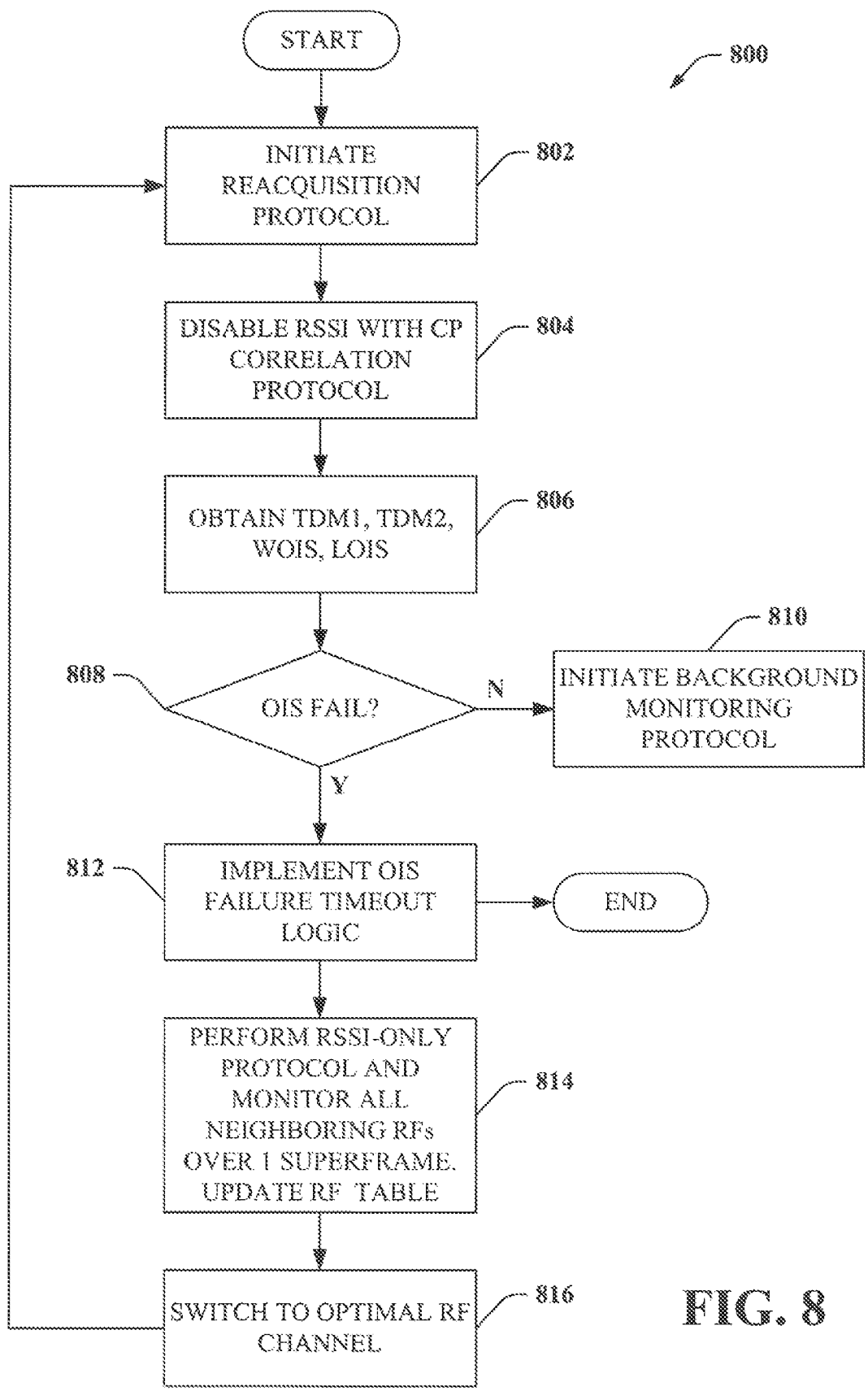
FIG. 8 is an illustration of a methodology for performing reacquisition of an RF in a wireless communication environment, in accordance with one or more aspects.

FIG. 8 is an illustration of a methodology 800 for performing reacquisition of an RF in a wireless communication environment, in accordance with one or more aspects. Method 800 may be similar to the reacquisition protocol described at 714 with regard to FIG. 7. At 802, a reacquisition protocol may be initiated. At 804, an RSSI+CP correlation protocol may be disabled. TDM1, TDM2, WOIS, and LOIS information may be obtained at 806. At 808, a determination may be made regarding whether an OIS failure has occurred. If the determination is negative, then at 810, a background monitoring protocol may be initiated, such as the background monitoring method 700 described above. If the determination is positive, then at 812, OIS failure timeout logic may be implemented. Upon a timeout indication, an RSSI-only protocol may be initiated and all neighboring RFs may be monitored over a superframe, at 814.

At 816, a switch may be made to an RF that has been identified as optimal (e.g., a destination RF) via one or more of the foregoing procedures. In this manner, an optimal RF may be reacquired for device communication upon MLC failure. In accordance with various aspects, separate timers can be implemented for the OIS failure timeout at 808 and for a complete MLC failure described above with regard to FIG. 7. Additionally, separate timers may be maintained for wide-area and local systems. The OIS timer may be reset upon detected OIS success. Moreover, the complete MLC failure timer may be reset upon the successful decoding of at least one MLC.

In accordance with other aspects, configurable parameters associated with the foregoing methods and/or systems may include, for example, hysteresis margins (e.g., Hys1_H, Hys1_L, Hys2, etc.), RSSI threshold to enable RF monitoring, timeout for OIS failure in a reacquisition method and/or for MLC failure in a background monitoring method, etc. Other configurable parameters may comprise frequency of RF monitoring (e.g., monitoring neighboring RFs in one super frame every N superframes, where N is an integer), as well as other parameters configured by a network or mobile device.

Figure 9:
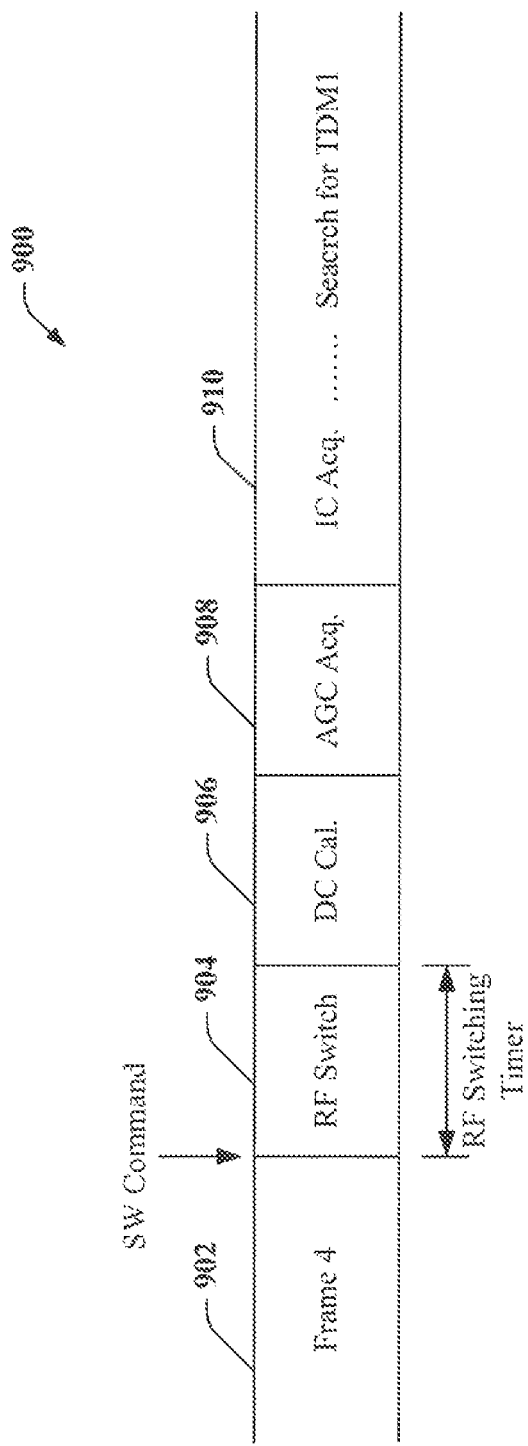
FIG. 9 illustrates a timeline for handoff across multiple RFs, in accordance with various aspects described herein.

FIG. 9 illustrates a timeline 900 for handoff across multiple RFs, in accordance with various aspects described herein. Handoff may be performed at the end of a super frame, which, according to an example, may contain four frames although more or fewer frames may be present in a superframe. According to the figure, a software command is provided to facilitate handoff to the new RF at the end of the last MLC in a Frame 4 902. Upon receipt of the software command, a user device can initiate an RF switching timer and can perform an RF switch during block 904, after which DC calibration may be performed at 906. AGC acquisition 908 and IC acquisition 910 may follow DC calibration. At this point in the timeline, TDM1 may be searched for as described above with regard to preceding figures.

The software command may program WID and LID fields for the user device with a new destination WID and/or LID. The command may additionally program AGC AFC registers and set an IC acquisition bit to 1, as well as program the new RF and trigger initialization of a hardware RF switching timer. Upon expiration of the hardware RF switching timer, hardware components may turn off an associated LNA and enable the DC calibration. Software may subsequently enable the TDM1 search.

Figure 10:
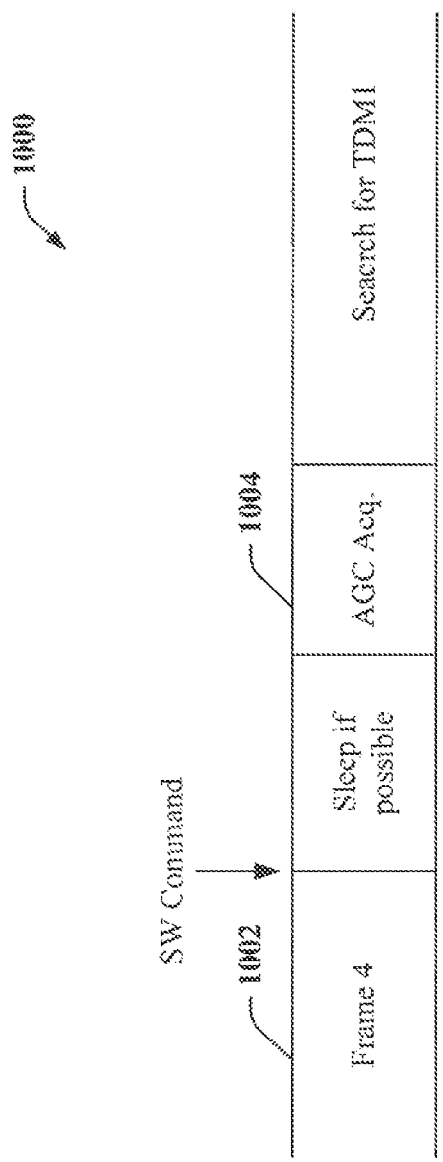
FIG. 10 is an illustration of a timeline for performing handoff within a same RF, in accordance with one or more aspects.

FIG. 10 is an illustration of a timeline 1000 for performing handoff to a different WID/LID within the same RF, in accordance with one or more aspects. A software command may be issued at the end of a fourth frame 1002 of a super frame, according to one example. The software command may handoff a user device to a new WID and/or LID for a same RF to which the user device was previously assigned. For instance, the software command may program WID/LID information for the device to a destination WID/LID, as well as program one or more AGC AFC registers and set an IC acquisition bit to 0. The software command may then put the device to sleep if sleep is possible in order to save power consumption. If sleep is possible, upon wakeup AGC acquisition 1004 may occur, followed by TDM1 search. In this manner, AGC acquisition 1004 and TDM1 search may occur subsequently to the wakeup. If software determines that sleep is not possible, the software command may trigger AGC acquisition 1004 and TDM1 search may occur subsequently to AGC acquisition 1004.

Figure 11:
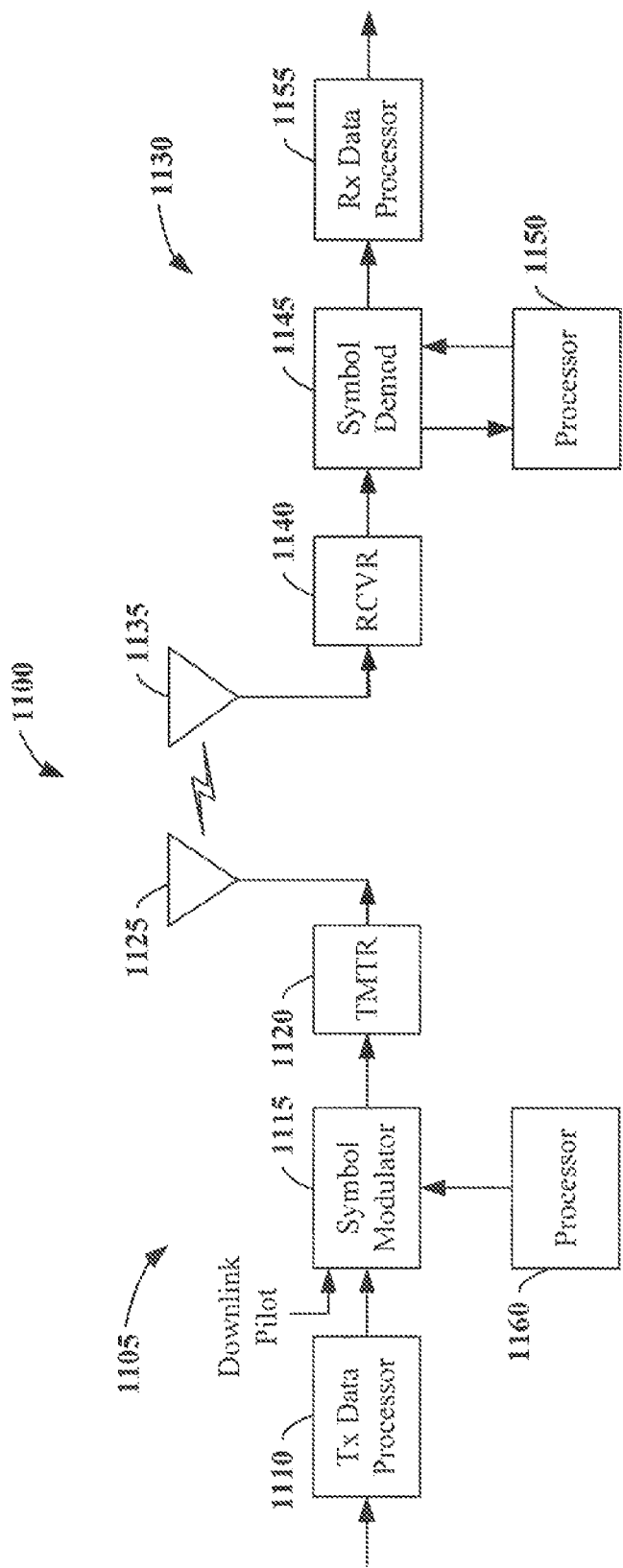
FIG. 11 is an illustration of a wireless network environment that can be employed in conjunction with the various systems and methods described herein.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1, 2, 4-6, and 9-11) and/or methods (FIGS. 3 and 7-8) described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1120 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1160.

Figure 12:
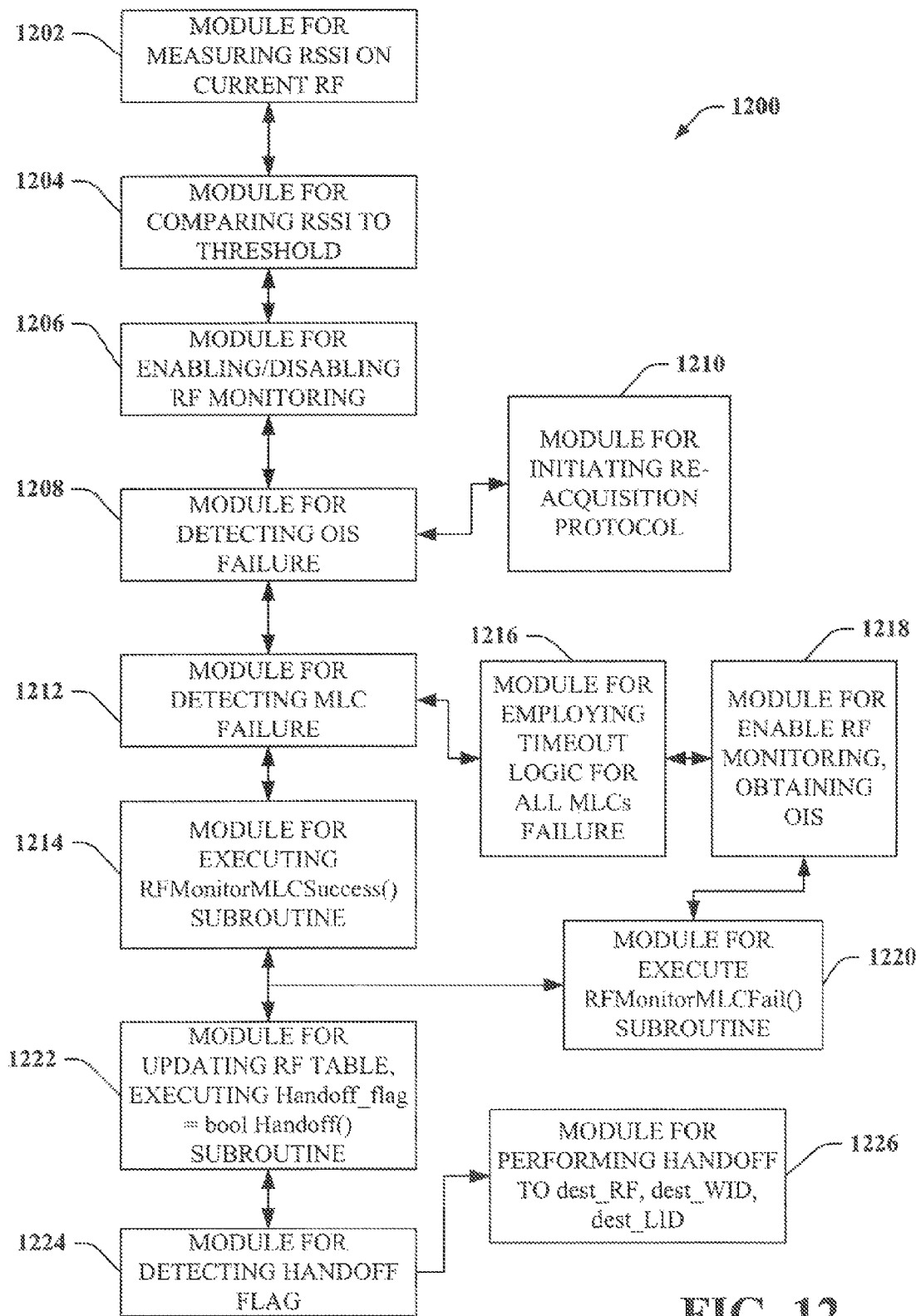
FIG. 12 illustrates an apparatus that facilitates switching between radio frequencies at an access terminal, in accordance with one or more aspects.

FIG. 12 is an illustration of an apparatus 1200 that facilitates switching between radio frequencies at an access terminal, in accordance with one or more aspects. Apparatus 1200 comprises a module for measuring an RSSI 1202 for a current RF over which an access terminal is communicating. The module for measuring the RSSI 1202 is operatively coupled to a module for comparing the measured RSSI to a threshold value 1204, which in turn is coupled to a module for enabling and disabling RF monitoring 1206. Module for enabling and disabling RF monitoring 1206 may enable RF monitoring when the measured RSSI is equal to or less than the threshold value, and may disable RF monitoring when the measured RSSI is greater than the threshold value.

Apparatus 1200 further comprises a module for detecting an OIS failure 1208 and means for executing a reacquisition protocol 1210, which may execute a protocol such as, for example, method 800, upon detection of an OIS failure. If no OIS failure is detected, then a module for detecting MLC failure 1212 may determine whether one or more MLC failures have occurred. If no MLC failures are detected, then a module for executing a first RF monitoring subroutine 1214 can execute a protocol for monitoring RFs in a successful MLC scenario. If one or MLCs fail, then a module for employing timeout logic 1216 may employ timeout logic associated with an MLC failure, and a module for obtaining an OIS 1218 may ensure that RF monitoring is enabled and obtain overhead information symbol information. A module for executing a second RF monitoring subroutine 1220 may execute a protocol for monitoring RFs in an unsuccessful MLC scenario. A module for updating an RF information lookup table and executing a handoff flag generation protocol 1222 may generate a handoff flag indicative of an RF or identity associated therewith to which an access terminal may be handed off, after execution of the first or second RF monitoring protocols. A module for detecting the handoff flag 1224 may identity an RF or identity associated therewith (e.g., a WID or LID), and a module for performing a handoff protocol 1226 may proceed to assign the access terminal to the new RF and/or associated identity.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of monitoring and switching between radio frequencies (RFs) at an access terminal in a wireless communication environment, comprising:
   determining a signal quality for a current channel via which a current signal is accessed;
   determining whether the determined signal quality is above a predetermined threshold value;
   determining a signal quality of a neighbor channel that carries a signal that is frame synchronized with the current signal when the determined signal quality is less than or equal to the predetermined threshold value;
   determining whether to perform a handoff to the neighbor channel based at least in part on the signal quality of the current channel and the signal quality of the neighbor channel;
   initiating the handoff to the neighbor channel at a time when a frame is expected to be received in the current signal; and
   disabling an RF monitoring for at least the current channel if the determined signal quality for the current channel is above the predetermined threshold value,
   wherein the determining the signal quality of the neighbor channel comprises determining a signal strength for the neighbor channel based on a cyclic prefix (CP) correlation.

2. The method of claim 1, further comprising enabling the RF monitoring if the determined signal quality is less than or equal to the predetermined threshold value.

3. The method of claim 1, further comprising determining whether a logical channel segment failure has occurred.

4. The method of claim 3, further comprising executing an RF monitoring subroutine if the logical channel segment failure has not occurred.

5. The method of claim 4, further comprising updating an RF lookup table and executing a handoff flag generation subroutine if no logical channel segment has been detected.

6. The method of claim 5, further comprising determining whether a handoff flag, which indicates that the handoff to the neighbor channel is to be initiated, is present.

7. The method of claim 6, wherein the neighbor channel is identified by the handoff flag.

8. The method of claim 3, further comprising initiating timeout logic upon a logical channel segment failure.

9. The method of claim 8, further comprising enabling the RF monitoring and obtaining overhead information symbol (OIS) information for a logical channel segment.

10. The method of claim 9, further comprising initiating an RF monitoring subroutine.

11. The method of claim 10, further comprising updating an RF lookup table and executing a handoff flag generation subroutine if a logical channel segment failure is detected.

12. The method of claim 11, further comprising determining whether a handoff flag, which indicates that the handoff to the neighbor channel is to be initiated, is present.

13. The method of claim 12, wherein the neighbor channel is identified by the handoff flag.

14. The method of claim 1, further comprising determining whether an overhead information symbol (OIS) failure has occurred.

15. The method of claim 14, further comprising initiating a background RF monitoring protocol if the OIS failure is not detected.

16. The method of claim 14, further comprising implementing OIS failure timeout logic if the OIS failure is detected.

17. The method of claim 16, further comprising updating an RF lookup table with information related to RFs that are monitored.

18. The method of claim 17, wherein the neighbor channel comprises an optimal RF having a highest received signal strength indicator (RSSI) value according to the RF lookup table.

19. A wireless communication apparatus, comprising:
   means for measuring a signal quality for a current channel via which a current signal is accessed;
   means for determining whether the measured signal quality is above a predetermined threshold value;
   means for monitoring a signal quality of a neighbor channel, wherein a signal of the neighbor channel is frame synchronized with the current signal when the measured signal quality is less than or equal to the predetermined threshold value;
   means for determining whether an overhead information symbol (OIS) decoding error has occurred in the current channel; and
   means for performing a reacquisition protocol when the OIS decoding error is determined to have occurred in the current channel, otherwise initiating a handoff to the neighbor channel at a time when a message is expected to be received in the current signal; and
   means for disabling an RF monitoring for at least the current channel if the measured signal quality for the current channel is above the predetermined threshold value,
   wherein the means for monitoring the signal quality of the neighbor channel comprises means for determining a signal strength for the neighbor channel based on a cyclic prefix (CP) correlation.

20. The apparatus of claim 19, wherein the signal quality includes at least one of a received signal strength indicator (RSSI), signal to interference plus noise ratio or cyclic prefix (CP) correlation.

21. The apparatus of claim 19, further comprising means for enabling the RF monitoring if the measured signal quality is less than or equal to the predetermined threshold value.

22. The apparatus of claim 19, further comprising means for determining whether one or more multi-level coded (MLC) segments failure has occurred.

23. The apparatus of claim 22, further comprising means for executing an "MLC successful" radio frequency (RF) monitoring subroutine if an MLC failure has not occurred.

24. The apparatus of claim 23, further comprising means for updating an RF lookup table and generating a handoff flag that indicates an imminent handoff of an associated access terminal to the neighbor channel if one or more MLC failures is detected.

25. The apparatus of claim 24, wherein the neighbor channel is identified by the handoff flag.

26. The apparatus of claim 22, further comprising means for initiating timeout logic upon an MLC failure, means for enabling the RF monitoring, and means for obtaining overhead information symbol (OIS) information for the one or more MLC segments.

27. The apparatus of claim 26, further comprising means for initiating an RF monitoring subroutine, means for updating an RF lookup table, and means for generating a handoff flag, which indicates that an associated access terminal is to be handed off to the neighbor channel, if one or more MLC failures is detected.

28. The apparatus of claim 27, wherein the neighbor channel is indicated by the handoff flag.

29. The apparatus of claim 19, further comprising means for initiating a background radio frequency (RF) monitoring protocol if the OIS decoding error has not occurred.

30. The apparatus of claim 19, further comprising means for implementing OIS failure timeout logic if the OIS decoding error has occurred.

31. The apparatus of claim 30, further comprising means for updating an RF lookup table with information related to the monitored RFs, wherein the neighbor channel comprises an optimal RF having a highest RSSI value according to the RF lookup table.

32. A non-transitory computer-readable medium having a computer program comprising computer-executable instructions for:
   measuring a signal quality for a current channel comprising a plurality of logical channels;
   determining whether the measured signal quality is above a predetermined threshold value;
   receiving a list that exclusively comprises a plurality of neighbor channels that each broadcast a substantially same contents as the current channel;
   monitoring a signal quality of a neighbor channel of the plurality of neighbor channels that each broadcast the substantially same contents as the current channel when the measured signal quality is less than or equal to a predetermined threshold value;
   determining whether a number of errors in any of the plurality of logical channels is above a threshold;
   determining whether an overhead information symbol (OIS) failure has occurred;
   implementing OIS failure timeout logic if the OIS failure has occurred;
   performing a handoff to the neighbor channel of the plurality of neighbor channels that each broadcast the substantially same contents as the current channel when the number of errors in any of the plurality of logical channels is above the predetermined threshold value; and
   disabling an RF monitoring for at least the current channel if the measured signal quality for the current channel is above the predetermined threshold value,
   wherein the monitoring the signal quality of the neighbor channel comprises determining a signal strength for the neighbor channel based on a cyclic prefix (CP) correlation.

33. The computer-readable medium of claim 32, wherein the signal quality includes at least one of a received signal strength indicator (RSSI), signal to interference plus noise ratio or cyclic prefix (CP) correlation.

34. The computer-readable medium of claim 32, further comprising instructions for enabling the RF monitoring if the measured signal quality is less than or equal to the predetermined threshold value.

35. The computer-readable medium of claim 32, further comprising instructions for executing an "MLC successful" radio frequency (RF) monitoring subroutine when the number of errors in all of the plurality of logical channels is below the predetermined threshold value.

36. The computer-readable medium of claim 35, further comprising instructions for updating an RF lookup table and generating a handoff flag that indicates an imminent handoff of an associated access terminal to the neighbor channel when the number of errors in any of the plurality of logical channels is above the predetermined threshold value.

37. The computer-readable medium of claim 36, wherein the neighbor channel is identified by the handoff flag.

38. The computer-readable medium of claim 32, further comprising instructions for initiating timeout logic when the number of errors in any of the plurality of logical channels is above the predetermined threshold value, for enabling the RF monitoring, and for obtaining overhead information symbol (OIS) information for each of the plurality of logical channels.

39. The computer-readable medium of claim 38, further comprising instructions for initiating an RF monitoring subroutine, for updating an RF lookup table, and for generating a handoff flag, which indicates that an associated access terminal is to be handed off to the neighbor channel, when the number of errors in any of the plurality of logical channels is above the predetermined threshold value.

40. The computer-readable medium of claim 39, wherein the neighbor channel is indicated by the handoff flag.

41. The computer-readable medium of claim 32, further comprising instructions for initiating a background radio frequency (RF) monitoring protocol if the OIS failure has not occurred.

42. The computer-readable medium of claim 41, further comprising instructions for updating a radio frequency (RF) lookup table with information related to the monitored RFs, wherein the neighbor channel comprises an optimal RF having a highest received signal strength indicator (RSSI) value according to the RF lookup table.

43. The method of claim 1 further comprising receiving a list that exclusively comprises a plurality of neighbor channels that each broadcast a substantially same contents as the current channel, wherein the list includes the neighbor channel.

44. An apparatus, comprising:
a memory; and
a processor coupled to the memory and configured to:
measure a signal quality for a current channel via which a current signal is accessed;
determine whether the measured signal quality is above a predetermined threshold value;
monitor a signal quality of a neighbor channel that carries a signal that is frame synchronized with the current signal when the measured signal quality is less than or equal to the predetermined threshold value;
determine whether to perform a handoff to the neighbor channel based at least in part on a decoder error rate of the current channel and the neighbor channel, wherein the decoder error rate of the neighbor channel is determined while accessing the current channel; and
initiate the handoff to the neighbor channel at a time when a message is expected to be received in the current signal; and
disable an RF monitoring for at least the current channel if the measured signal quality for the current channel is above the predetermined threshold value,
wherein the monitoring the signal quality of the neighbor channel comprises determining a signal strength for the neighbor channel based on a cyclic prefix (CP) correlation.

45. The apparatus of claim 44, wherein the signal quality includes at least one of a received signal strength indicator (RSSI), signal to interference plus noise ratio or cyclic prefix (CP) correlation.

46. The apparatus of claim 44, wherein the processor is further configured to
enable the RF monitoring if the measured signal quality is less than or equal to the predetermined threshold value.

47. The apparatus of claim 44, wherein the processor is further configured to determine whether one or more multi-level coded (MLC) segments failure has occurred.

48. The apparatus of claim 47, wherein the processor is further configured to execute an "MLC successful" RF monitoring subroutine if an MLC failure has not occurred.

49. The apparatus of claim 48, wherein the processor is further configured to update a radio frequency (RF) lookup table and generating a handoff flag that indicates an imminent handoff of an associated access terminal to the neighbor channel if one or more MLC failures is detected.

50. The apparatus of claim 49, wherein the neighbor channel is identified by the handoff flag.

51. The apparatus of claim 47, wherein the processor is further configured to:
initiate timeout logic upon an MLC failure, enabling radio frequency (RF) monitoring; and
obtain overhead information symbol (OIS) information for the one or more MLC segments.

52. The apparatus of claim 51, wherein the processor is further configured to initiate an RF monitoring subroutine, update an RF lookup table, and generate a handoff flag, which indicates that an associated access terminal is to be handed off to the neighbor channel, if one or more MLC failures is detected.

53. The apparatus of claim 52, wherein the neighbor channel is indicated by the handoff flag.

54. The apparatus of claim 44, wherein the processor is further configured to determine whether an overhead information symbol (OIS) failure has occurred.

55. The apparatus of claim 54, wherein the processor is further configured to initiate a background radio frequency (RF) monitoring protocol if the OIS failure has not occurred.

56. The apparatus of claim 51, wherein the processor is further configured to update a radio frequency (RF) lookup table with information related to the monitored RFs, wherein the neighbor channel comprises an optimal RF having a highest received signal strength indicator (RSSI) value according to the RF lookup table.

* * * * *